UNITED STATES PATENT OFFICE.

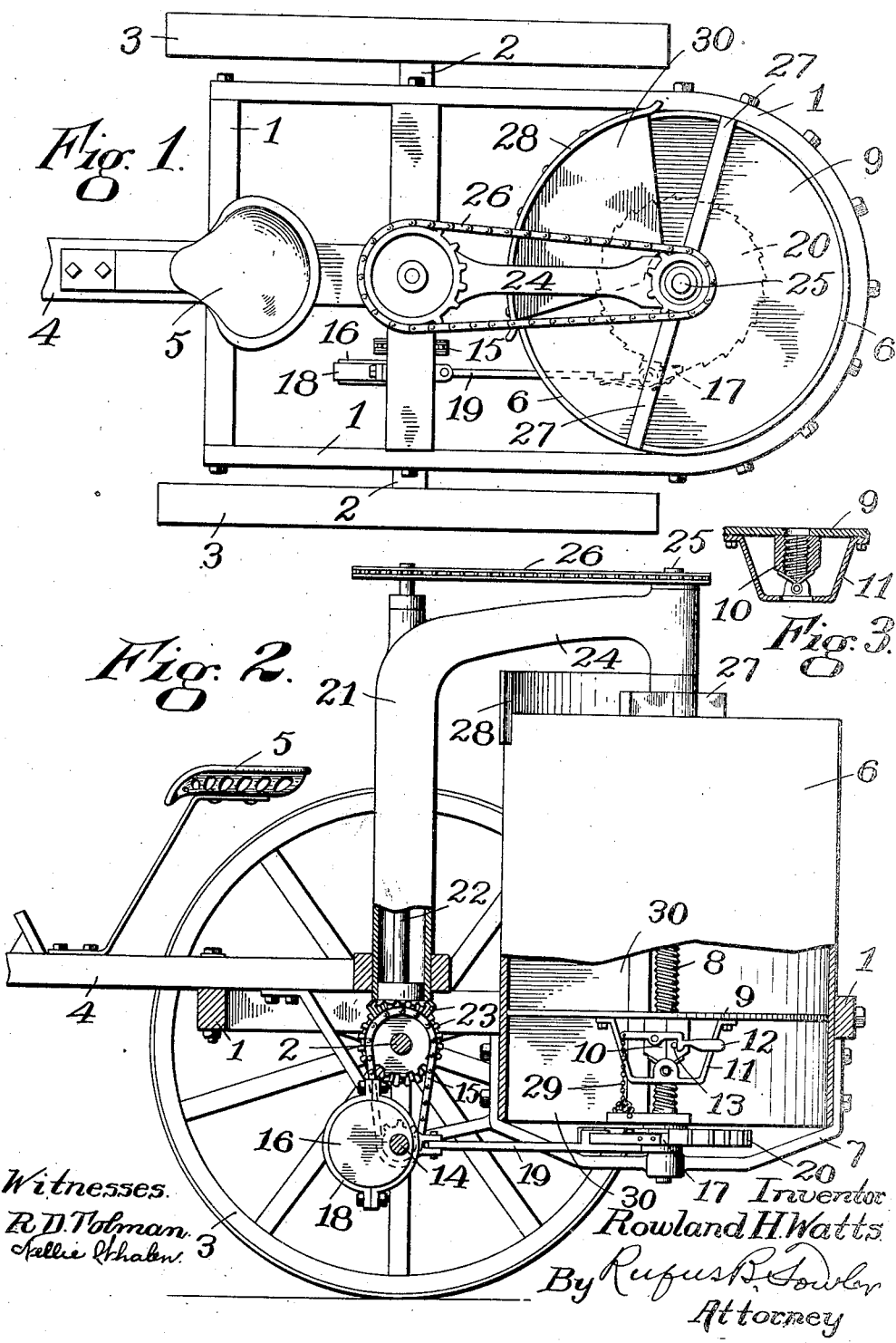

ROWLAND H. WATTS, OF CONCORD, MASSACHUSETTS, ASSIGNOR OF ONE-HALF TO RICHARDSON MANUFACTURING COMPANY, OF WORCESTER, MASSACHUSETTS, A CORPORATION OF MASSACHUSETTS.

FERTILIZER-SPREADER.

1,132,053.  Specification of Letters Patent.  Patented Mar. 16, 1915.

Application filed October 25, 1912. Serial No. 727,693.

*To all whom it may concern:*

Be it known that I, ROWLAND H. WATTS, a citizen of the United States, residing at Concord, in the county of Middlesex and Commonwealth of Massachusetts, have invented a new and useful Improvement in Fertilizer-Spreaders, of which the following is a specification accompanied by drawings forming a part of the same.

My invention relates to fertilizer spreaders and has particular reference to vehicles adapted to be drawn by horses or otherwise for spreading commercial fertilizer over land upon which crops are to be grown.

One object of the invention is to provide a spreader of the class referred to which shall be particularly efficient in spreading the various forms of more or less finely divided commercial fertilizer.

A further object of the invention is to provide a spreader which will act efficiently to spread commercial fertilizer as well when such fertilizer is moist as when it is dry. Some forms of fertilizer are hygroscopic and if left for a time exposed to the atmosphere will absorb sufficient moisture to cause forms of spreaders previously used to become more or less clogged and to spread the fertilizer unevenly or not at all. A machine constructed in accordance with my invention will overcome this difficulty.

Further objects and advantages will appear in the following description of one embodiment of the invention, taken in connection with the accompanying drawings, in which—

Figure 1 is a plan view of a spreader adapted to be drawn by a team of horses, the tongue being broken away. Fig. 2 is a side view of the same spreader, the tongue being broken away and parts of the spreader being in section in order to show details. Fig. 3 is a detail vertical sectional view of the screw threaded clamp shown in elevation in Fig. 2.

Similar reference characters indicate like parts in the different figures.

The form of spreader shown in the drawings includes a frame 1 carried by an axle 2 and wheels 3. Secured to the forward part of the frame is a tongue 4 by which a team of horses may draw the spreader. A seat 5 is provided for a driver.

Vertically supported at the rear of the frame 1 is a hollow cylindrical receptacle 6 to contain the fertilizer. A bar 7 is fastened diametrically across the open bottom of the receptacle 6 and at its center this bar pivotally supports a screw 8 extending upwardly along the vertical axis of the receptacle. A horizontal plate or platform 9 fits within the receptacle 6 and acts as a support for the fertilizer. The screw 8 passes through a hole in the plate 9 and supports this plate by means of a separable clamp 10 engaging the screw 8 and secured to the plate 9 by a connection 11. The lower extremities of the two portions of the clamp are hinged together and to the connection 11 to allow the clamp to open and close and the clamp may be held closed when desired by a catch or lever 12 pivoted to one portion of the clamp, a shoulder on the lever 12 engaging a pin 13 on the other portion of the clamp. The inner faces of the two portions of the clamp are screw threaded to engage the threads of the screw 8 so that as the screw 8 is turned by means to be described, the clamp will be moved along the screw and will carry with it the plate or support 9.

The axle 2 is turned by the wheels 3 as the spreader is drawn along and this axle drives a shaft 14 by means of a sprocket chain 15 running on sprocket wheels fixed to the axle and shaft. The shaft 14 carries an eccentric 16 which oscillates a pawl 17 by means of an eccentric strap 18 and a connecting rod 19. As the pawl 17 oscillates, it turns a large ratchet wheel 20 step by step and this ratchet wheel, being secured to the screw 8, turns the screw with it. Assuming now that the two portions of the clamp 10 are held together by the catch 12 so that their threads engage the threads of the screw 8, the relation of parts is such that as the spreader is drawn forwardly along the ground, the screw 8 will force the clamp and the plate 9 slowly and gradually upward. The fertilizer resting on the plate 9 in the receptacle 6 is thereby fed slowly out of the open top of the receptacle to be distributed by means to be described.

A hollow vertical post 21 extends above the axle 2 and in bearings at the upper and lower ends of this post is carried a shaft 22 which is turned by the axle 2 through the medium of a pair of bevel gears 23.

An arm 24 extends rearwardly from the top of the post 21 to a point over the center of the receptacle 6 where it supports a vertical shaft 25 in a suitable bearing. The upper end of each of the shafts 22 and 25 are provided with sprocket wheels and these two sprocket wheels are operatively connected by a sprocket chain 26. The lower end of the shaft 25 carries horizontal arms 27 lying close to and across the top of the receptacle 6. By the train of mechanisms just described, it is obvious that as the axle 2 revolves it will rotate the arms 27 in a horizontal plane.

As the fertilizer is raised slowly by the support 9 into the path of the arms 27, these arms, at each revolution, scrape off a small quantity of the fertilizer and throw it by centrifugal force outwardly from the top of the receptacle 6. It is preferable that the arms 27 rotate rapidly enough, usually about six or eight times each second, to throw the fertilizer so as to be scattered over considerable ground. While the arms 27 are shown in the drawing as being horizontal and while I now consider this position preferable, these arms might, of course, slant more or less either upwardly or downwardly from their axis of rotation and still accomplish the same results.

The fertilizer should not be thrown forwardly so as to strike the seat or other parts of the spreader and to prevent this a guard 28 is provided. This guard is in the form of a flange extending from the forward portion of the upper edge of the receptacle 6 across the plane in which the arms 27 rotate. The flange 28 is extended rearwardly considerably farther at one side of the receptacle 6 than at the other side, the greater extension being on that side of the receptacle at which the arms 27 move forwardly. It is obvious that this unequal extension of the flange 28 is necessary in order that the distribution of fertilizer on the two sides of the spreader may be substantially equal.

Inasmuch as no fertilizer is distributed past that portion of the edge of the receptacle 6 where the flange 28 is located, that portion of the receptacle 6 between the side of the receptacle under the flange and its axis is filled in by a filler 30, a corresponding sector shaped piece of the plate 9 being removed so that the plate may fit against the sides of the filler 30 and completely fill the open space in the receptacle 6.

It is desirable to prevent the plate 9 from being raised so far as to strike the rotating arms 27, and to accomplish this, I extend the lever 12 beyond its pivot and connect the free end of the extension to some fixed point at the bottom of the receptacle 6 by a chain 29. The chain 29 is just long enough to allow the plate 9 to rise till it is close to the top of the receptacle 6 when substantially all the fertilizer will have been distributed, the chain then becoming tight and releasing the lever 12 from the pin 13.

The clamp 10 will then open and with the plate 9 will fall to the bottom of the receptacle 6. When it is not desired to distribute any fertilizer and even with more or less in the receptacle 6, the clamp 10 may be left open and the plate 9 will not be raised. Then when it is desired to distribute or spread fertilizer, all that is necessary is to close the clamp 10 and secure its parts together by the catch or lever 12, when the plate 9 will begin to rise to cause the fertilizer to be distributed or spread by the arms 27.

I do not wish to be limited to the details of construction shown and described, as various changes may be made without departing from the spirit of the invention, but having described one embodiment of my invention what I claim as new and desire to secure by Letters Patent is:—

1. A fertilizer spreader including a fertilizer receptacle with an opening at its top, fertilizer distributing means at the opening, said distributing means being revoluble about a substantially vertical axis for distributing fertilizer in a plurality of angularly different directions, and means for raising fertilizer contained in the receptacle into the path of the distributing means to be distributed thereby.

2. A fertilizer spreader including a fertilizer receptacle having an open top, means for raising fertilizer within the receptacle, means for spreading fertilizer in a plurality of angularly different directions from the edge of the receptacle surrounding the opening in its top, and a guard to prevent spreading of the fertilizer in predetermined directions.

3. A fertilizer spreader including a fertilizer receptacle having an open top, means for raising fertilizer within the receptacle, means for spreading fertilizer from the edge of the receptacle surrounding the opening in its top, a guard at one side of the receptacle to prevent the spreading of fertilizer in predetermined directions, and a filler to prevent fertilizer being raised at the side of the receptacle provided with the guard.

4. A fertilizer spreader including a fertilizer receptacle with an opening at its top, a horizontal arm at the opening, said arm being revoluble about a substantially vertical axis for distributing fertilizer in a plurality of angularly different directions, and means for raising fertilizer contained in the receptacle into the path of the revoluble arm to be distributed thereby.

5. A fertilizer spreader including a fertilizer receptacle having an open top, a substantially horizontal fertilizer spreading arm at the opening, said arm being revoluble about a substantially vertical axis, and means for raising fertilizer within the receptacle into the path of the arm.

6. A fertilizer spreader including fertilizer spreading means revoluble about a substantially vertical axis, and means for carrying fertilizer upwardly into the path of said spreading means to be spread thereby.

7. A fertilizer spreader including a fertilizer support, fertilizer spreading means revoluble in a plane substantially parallel to said support, and means for moving the support to carry fertilizer upwardly into the path of said spreading means to be spread thereby.

Dated this 21st day of October, 1912.

ROWLAND H. WATTS.

Witnesses:
 HERBERT H. YOUNG,
 LUCIUS A. HESSELTON.